April 27, 1965   R. L. VAN HUIS ETAL   3,180,314
ANIMAL CAGE WITH CONVEYOR
Filed July 23, 1963
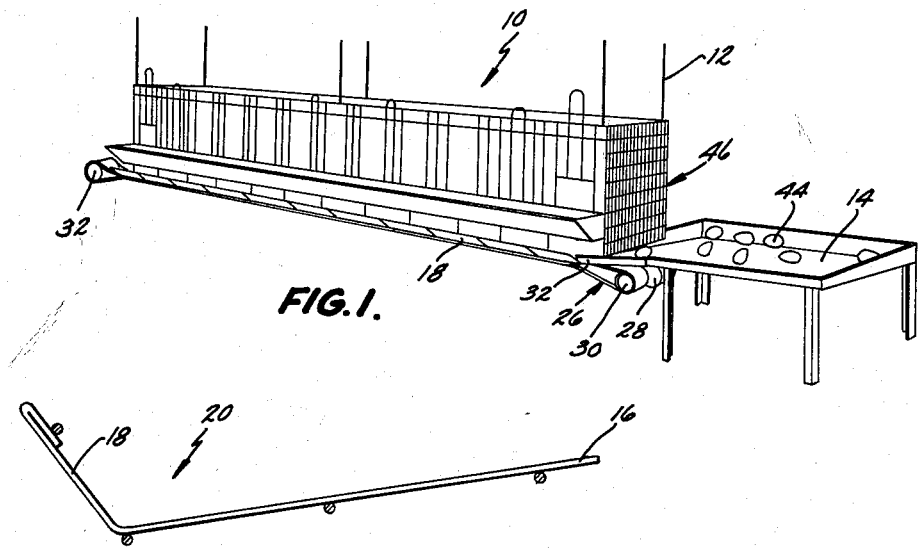
FIG. 1.
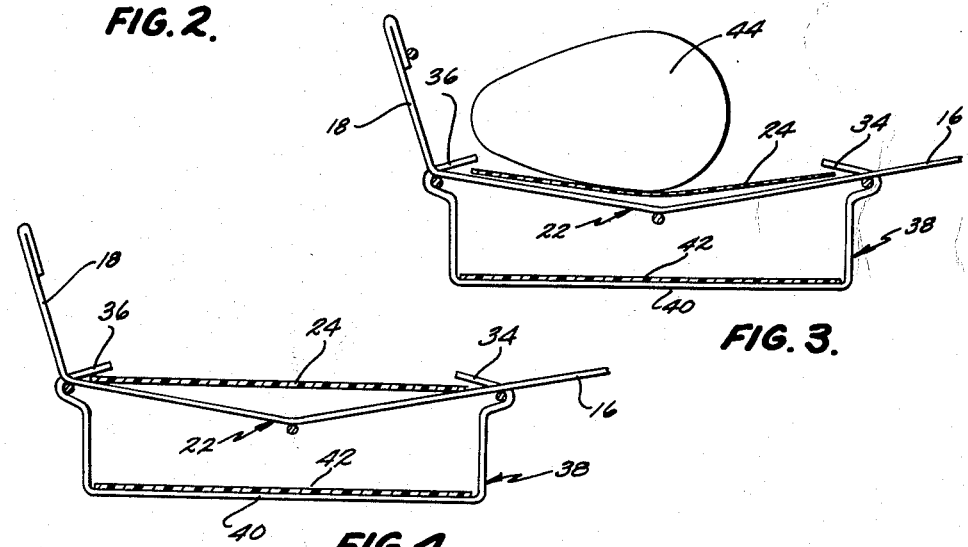
FIG. 2.
FIG. 3.
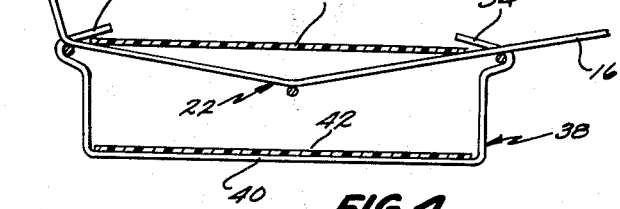
FIG. 4.
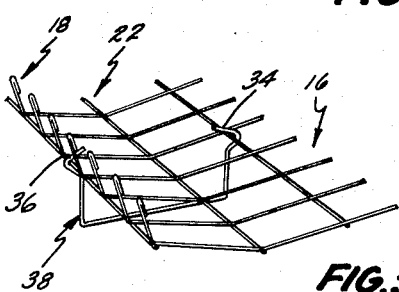
FIG. 5.
INVENTOR.
Jewel Graves
Robert L. Van Huis
BY
Price + Heneveld

3,180,314
ANIMAL CAGE WITH CONVEYOR
Robert L. Van Huis, Zeeland, and Jewel Graves, Holland, Mich., assignors to Automatic Poultry Feeder Company, Zeeland, Mich., a corporation of Michigan
Filed July 23, 1963, Ser. No. 297,092
3 Claims. (Cl. 119—48)

This invention concerns automatic egg collecting in the poultry industry, and more particularly a method and means for conveyorizing the egg collecting troughs of poultry cage arrays. In large scale poultry raising operations, it is known to suspend an array or row of cages from an appropriate overhead support. These cages are made of wire mesh, and each cage has a bottom of wire mesh with apertures sufficiently large for eggs to pass through, but small enough to confine the laying hen in the cage. Beneath the bottom of the cage is an inclined wire mesh surface which terminates at the front of the cage array in an elongated egg collecting trough. The collecting surface and trough are also formed of wire mesh, but the apertures of this mesh are small enough so that the eggs will not pass through it. The eggs therefore roll to the end of the inclined surface in front of the cages where they are stopped by an upwardly inclined retaining flange formed as part of the egg collecting trough.

As the poultry operation grows, it is often desirable to automate the collection process by conveying the eggs automatically from the egg collecting trough to a sorting table where they can be graded and packed. However, such automation is economically and practically feasible only if the conveyor can be quickly and easily installed, is relatively inexpensive, and does not require modification or replacement of the cage arrays.

The present invention offers a practical solution to this problem by providing a conveying mechanism which can be cheaply and quickly installed on existing cages by merely bending the wire mesh of the egg collecting trough, slipping a conveying belt over the trough, and fastening it in place with simple resilient clips which can be quickly clipped to the wire mesh of the egg collecting trough by unskilled personnel without the use of tools.

It is therefore the object of the invention to provide a conveying means for eggs which can be quickly and easily installed on egg collecting troughs of poultry cage arrays.

This and other objects of the invention will become apparent from the following specification taken in connection with the accompanying drawings in which:

FIG. 1 is a perspective view of a cage array and sorting table using the device of the invention;

FIG. 2 is a fragmentary vertical section of the egg collecting trough of a standard cage array without conveying means;

FIG. 3 is a fragmentary vertical section like FIG. 2, but showing the trough reshaped in accordance with the invention and showing the conveyor belt installed and in the process of transporting an egg;

FIG. 4 is a view similar to FIG. 3 but showing the condition of the conveyor belt when it is not carrying an egg; and FIG. 5 is a fragmentary perspective view of the egg collecting trough modified to receive the conveyor belt and showing a supporting clip in operating position, but with the belt removed.

Basically, the egg collecting trough of FIG. 2 is converted to conveyorized operation by bending its flat inclined surface to form a shallow, generally V-shaped belt support. The conveying run of a thin, flexible belt is then placed onto the belt support thus formed, so that when an egg rolls onto the conveying belt, the weight of the egg will deform the belt to a shape approximating the V-shape of the belt support so as to keep the egg centered on the conveyor belt as it is being conveyed. The return run of the belt is supported by clips which are hooked to the wire mesh on each side of the belt support and have a flat lower portion below the egg collecting trough for carrying the return run of the belt, and a pair of fingers extending above the edges of the conveying run of the belt on each side thereof. The latter fingers, together with the belt support, form a guide which prevents excessive lateral displacement of the conveying run of the belt.

Referring now to the drawings, FIG. 1 shows an overall view of the system of this invention in which an array 10 of poultry cages is suspended by appropriate suspension means 12 next to a sorting table 14. Underneath the apertured floor (not shown) of these conventional cages is an inclined flat wire mesh structure 16 which terminates at the front of the cages in an upwardly inclined wire mesh flange 18 which forms an egg collecting trough 20 extending longitudinally in front of the entire length of the cage array 10. In the prior art, the eggs rolled into this egg collecting trough 20 and were removed therefrom by hand.

In order to obtain the conveyorized operation depicted by FIGS. 1, 3 and 4, the flat, downwardly inclined surface of the egg collecting trough 20 is first bent to a V-shape illustrated by FIGS. 3 through 5. The V-shaped portion 22 of the structure 16 thus formed constitutes a channel-like support for the conveying run 24 of a flexible conveyor belt 26, preferably manufactured of thin, resilient plastic. The belt 26 is preferably driven by a motor 28 which may be attached to the sorting table 14 as shown in FIG. 1. The belt 26 is entrained over a pulley 30 attached to the motor 28 at one end of the cage array, and over an idler pulley 32 attached by any convenient means to the cage array 10 at the other end of the cage array. A diverter arm 32 brushes the conveyed egges off the conveyor belt 26 and onto the sorting table 14.

Lateral motion of the conveying run 24 of the belt 26 is limited by the fingers 34, 36 of the clips 38 which coact with the structure 16 to form lateral guides which hold the conveying run 24, belt 26 in its proper position. The clips 38 are hooked over the wire mesh structure of the egg collecting trough 20 in a manner best shown in the perspective view of FIG. 5. The clips 38 are preferably resilient so as to remain firmly in place, and they are preferably coated with a lubricous material such as an appropriate plastic to reduce friction between themselves and conveying belt 26. The straight bottom portion 40 of the clips 38 supports the return run 42 of belt 26 as best illustrated in FIGS. 3 and 4.

FIG. 4 illustrates the normal flat condition of the conveying belt when there is no load on it. When an egg 44 rolls onto the conveying run 24 of belt 26, as illustrated in FIG. 3, the belt flexes under the weight of the egg into a shape approximating that of the V-shaped belt support 22. This causes the egg 42 to roll into the middle of the conveying run 24 of belt 26, so that it will neither roll off the belt laterally nor come into contact with the fingers 34, 36 of the clips 38. When there is no egg on the belt, the conveying run 24 of the belt returns to its normal condition of FIG. 4 in which friction between the belt and the collecting structure 16 is minimized.

*Assembly and operation*

A significant feature of the present invention is the fact that it permits automation of egg collecting on a conventional cage array without requiring replacement of the cage array itself nor any structural modifications to the cage array which would require skilled labor or close tolerances. In converting the cage array 10 to automated operation, its end 46 is first secured to a sorting table 14 by any appropriate means. The outer end of the egg collecting structure 16 is then bent upwardly to form the V-shaped belt support 22, and the belt 26 is slipped over the egg retaining flange 18 into the position shown in FIGS. 3 and 4. The belt is next entrained over the pulleys 30, 32, and the clips 38 are snapped into place from the underside of the egg collecting trough 20. The belt is now tightened in any appropriate manner, as for example by adjusting the connection between the cage array 10 and the sorting table 14, the diverter arm 32 is put in place, and the unit is ready to operate.

In operation, the eggs falling onto the structure 16 of the conventional array roll down onto the conveying run 24 of belt 26 where they center themselves as a result of the flexure of the belt. When the operator is ready to proceed with the sorting operation, he turns on the motor 28, and the eggs 44 are conveyed onto the sorting table 14 where they can be processed. When all the eggs have been conveyed to the sorting table, the motor 28 may be turned off again until such time as enough eggs have accumulated for the operator to undertake another sorting operation.

It will be seen that the present invention provides a simple and economical method of automating egg collection on conventional cage arrays. Obviously, the teachings of the invention can be carried out in a variety of different ways, and it is therefore to be understood that the invention is not limited by the embodiments shown and described, but only by the scope of the following claims.

We claim:
1. Poultry handling equipment comprising a cage array having a plurality of enclosures and an elongated egg collecting trough of wire mesh extending at an inclined angle downwardly from said enclosures, said trough having a bottom with a bend intermediate its end and said enclosures forming a shallow V-shaped support; a flexible conveyor belt means positioned longitudinally of said trough over said bend for receiving and conveying eggs rolling on said belt, said belt after completion of conveying returning underneath said trough; and clip means supported at spaced intervals on said wire mesh of the trough, said clip means extending below said trough and having a horizontal portion spaced therebeneath forming supports for the return run of said conveyor belt means beneath said egg collecting trough.

2. The device of claim 1, in which said clip means include fingers extending transversely of said trough above its surface and forming therewith guide means for maintaining lateral alignment of said conveyor belt means.

3. The device of claim 2, in which said clip means are coated with a lubricous material.

References Cited by the Examiner
UNITED STATES PATENTS

| | | | |
|---|---|---|---|
| 2,631,717 | 3/53 | Cox | 198—202 |
| 2,745,379 | 5/56 | Schmidt | 119—48 |
| 2,973,742 | 3/61 | Kaegebein | 119—48 |

SAMUEL KOREN, *Primary Examiner.*

HUGH R. CHAMBLEE, *Examiner.*